(12) United States Patent
Borremans et al.

(10) Patent No.: US 12,490,527 B2
(45) Date of Patent: Dec. 2, 2025

(54) IMAGING SYSTEM USING SPATIALLY SEPARATED SPECTRAL ARRAYS

(71) Applicant: Spectricity, Mechelen (BE)

(72) Inventors: Jonathan Borremans, Lier (BE); Maarten De Bock, Ghent (BE)

(73) Assignee: Spectricity, Mechelen (BE)

( * ) Notice: Subject to any disclaimer, the term of this patent is extended or adjusted under 35 U.S.C. 154(b) by 393 days.

(21) Appl. No.: 18/313,932

(22) Filed: May 8, 2023

(65) Prior Publication Data
US 2023/0402485 A1 Dec. 14, 2023

Related U.S. Application Data

(60) Provisional application No. 63/366,109, filed on Jun. 9, 2022.

(51) Int. Cl.
*H10F 39/18* (2025.01)
*H10F 39/00* (2025.01)

(52) U.S. Cl.
CPC ....... *H10F 39/182* (2025.01); *H10F 39/8053* (2025.01); *H10F 39/806* (2025.01)

(58) Field of Classification Search
CPC ... H10F 39/182; H10F 39/8053; H10F 39/806
See application file for complete search history.

(56) References Cited

U.S. PATENT DOCUMENTS 9,184,198 B1 * 11/2015 Miao ................. H10F 39/1825
11,408,767 B1 * 8/2022 Houck ................ G01N 21/255
2017/0236861 A1 * 8/2017 Ockenfuss ............... G01J 3/26
  257/432
2020/0075652 A1 * 3/2020 Chen ................... H04N 13/344
2023/0012033 A1 * 1/2023 Bourreau .............. G02B 5/285

FOREIGN PATENT DOCUMENTS

JP 2016224041 A * 12/2016 ............ G01J 3/2803
WO WO-2019080339 A1 * 5/2019 ............. G02B 27/44

* cited by examiner

*Primary Examiner* — Amy R Hsu
(74) *Attorney, Agent, or Firm* — Katz Ruby & Carle LLP; Kelly H. Hale

(57) ABSTRACT

A system for imaging includes an array of optical sensors having a respective top surface and a respective bottom surface and a first plurality of sets of optical filters, each set of optical filters of the first plurality of sets of optical filters being associated with a respective set of optical sensors of the array. The system further includes a second plurality of sets of optical filters, each set of optical filters of the second plurality of sets of optical filters being associated with a respective set of optical sensors of the array, each optical filter of a set of optical filters of the second plurality of sets of optical filters configured to pass light of a respective wavelength range, where the second plurality of sets of optical filters are interspersed spatially across the top surface of the array of optical sensors. Finally, the system includes one or more processors adapted to sample an image of a scene based on an output from a first plurality of sets of optical sensors of the array and sample a received light spectrum for each set of optical sensors of a second plurality of sets of optical sensors of the array.

20 Claims, 12 Drawing Sheets

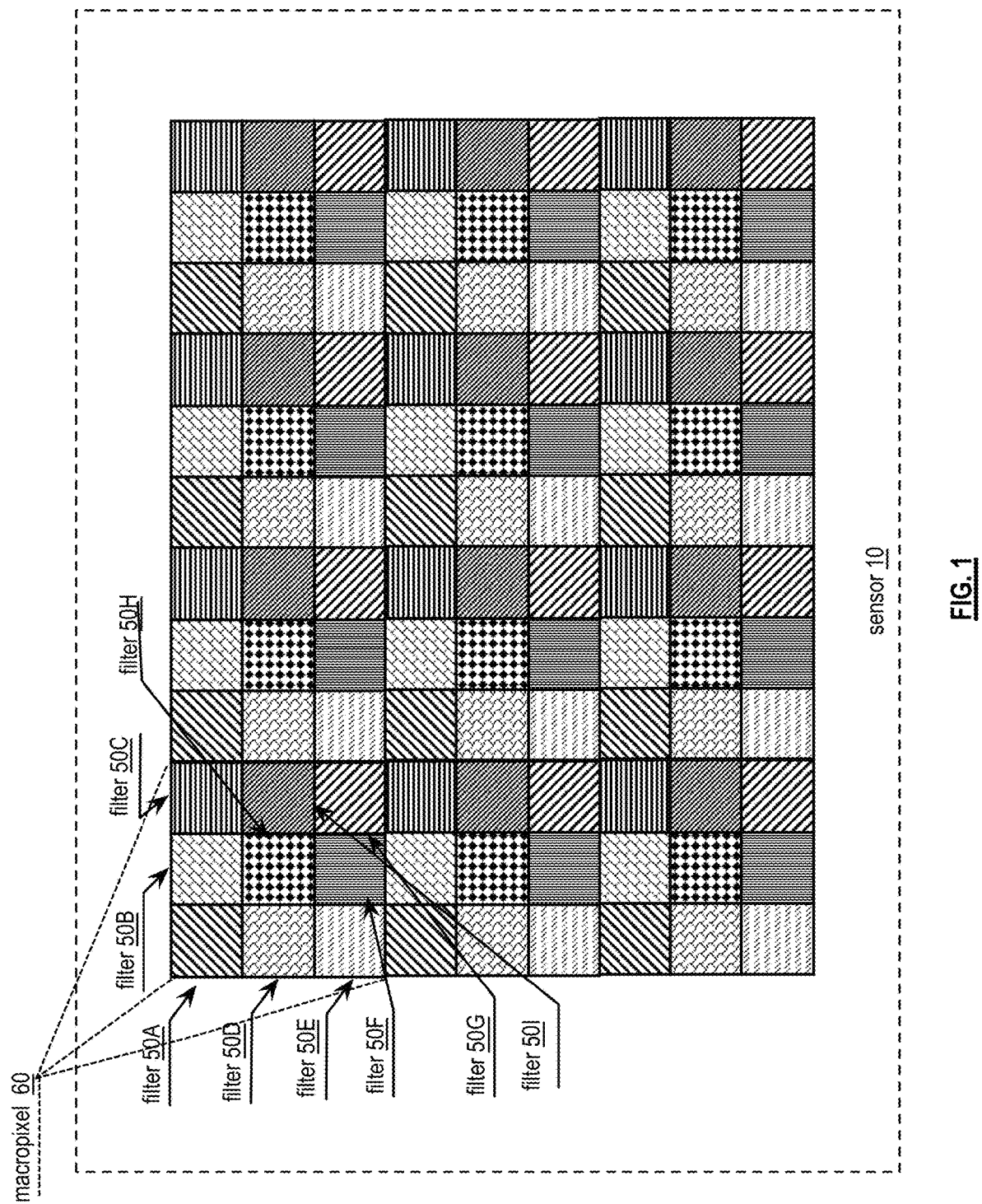

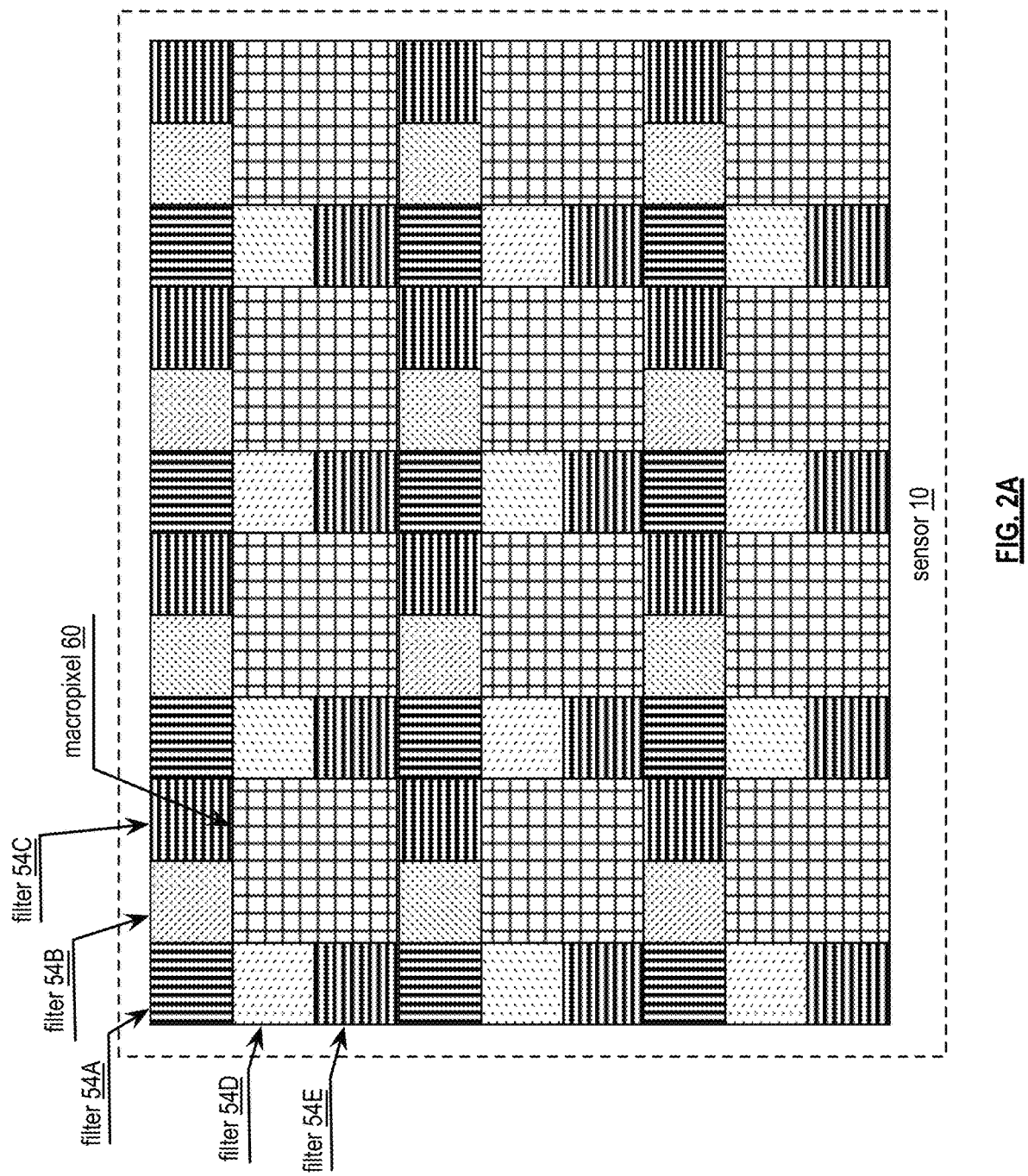

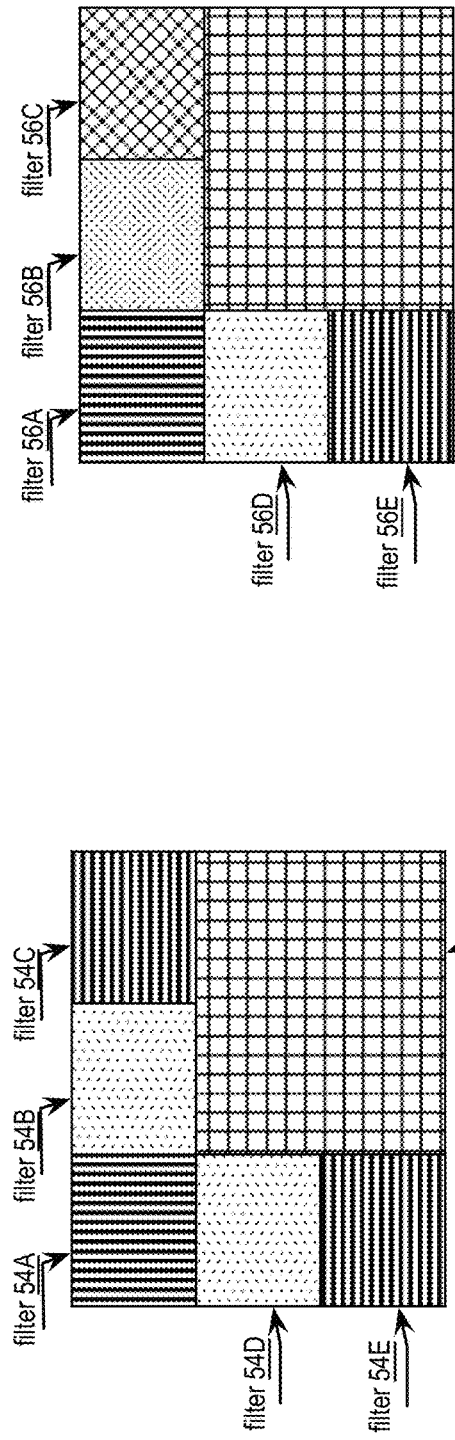
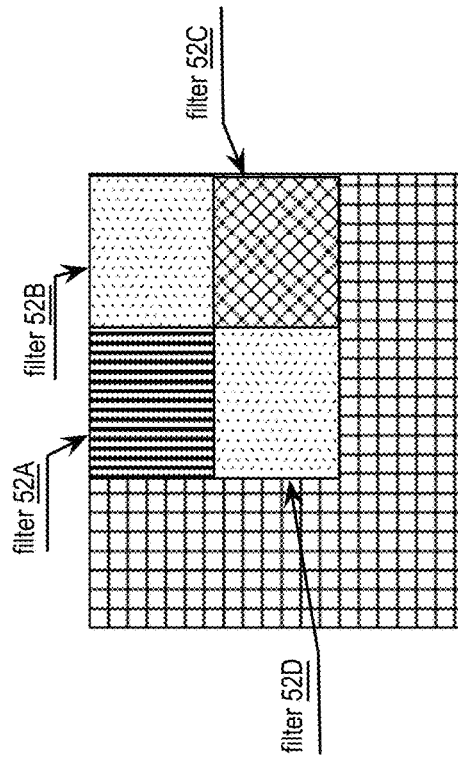
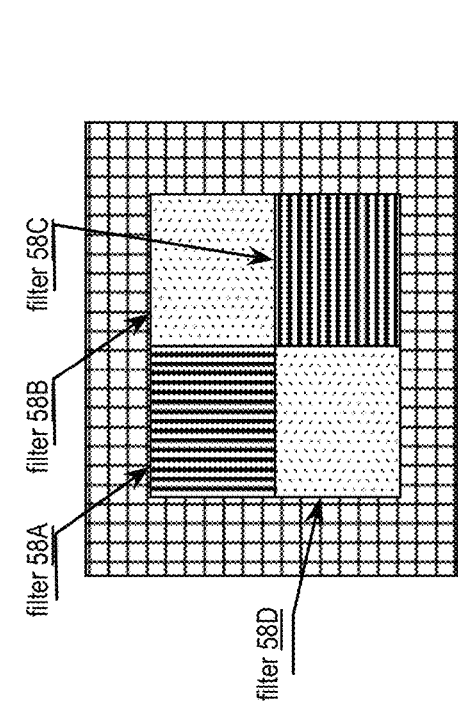
FIG. 2B
FIG. 2C
FIG. 2D
FIG. 2E

IMAGING SYSTEM USING SPATIALLY SEPARATED SPECTRAL ARRAYS

CROSS REFERENCE TO RELATED PATENTS

The present U.S. Utility patent application claims priority pursuant to 35 U.S.C. § 119(e) to U.S. Provisional Application No. 63/366,109, entitled "IMAGING SYSTEM USING SPATIALLY SEPARATED SPECTRAL SUB-ARRAYS," filed Jun. 9, 2022, which is hereby incorporated herein by reference in its entirety and made part of the present U.S. Utility patent application for any and all purposes.

BACKGROUND OF THE INVENTION

Technical Field of the Invention

This invention relates generally to digital imaging and more particularly to compensating for light source distortion using spectral sensors with interference-based filters.

Digital imaging has had a profound effect on the quality and availability of camera technology. At the same time, the expectations of camera consumers have become ever more demanding, especially for cameras embedded in modern smart phones. Spectroscopy devices, which function by detecting and/or acquiring incident light relating to multiple ranges of wavelengths, can be used to provide spectral information to assist camera functions. Interference-based filters, such as Fabry-Perot filters, when used in conjunction with spectral sensors have been shown to be capable of providing information that can be used for added camera performance and functionality.

BRIEF DESCRIPTION OF THE SEVERAL VIEWS OF THE DRAWING(S)

FIG. 1 provides a top-down illustration of an example optical sensor overlaid with filters in accordance with the present invention;

FIG. 2A provides a top-down illustration of an example imaging array incorporating spectral macropixels in accordance with the present invention;

FIGS. 2B-2E provide top-down illustrations of example individual imaging structures incorporating spectral macropixels in accordance with the present invention;

FIG. 3 provides another top-down illustration of an example imaging array incorporating spatially separated spectral macropixels in accordance with the present invention;

FIG. 4A provides another top-down illustration of an example imaging array incorporating a filter mosaic for an example spectral macropixel in accordance with the present invention;

FIG. 4B provides another top-down illustration of an example imaging array incorporating spatially separated partial spectral mosaics of example spectral macropixels in accordance with the present invention;

FIG. 4C provides an image illustrating the implementation of an imaging array incorporating spatially separated spectral macropixels in accordance with the present invention;

FIG. 5 provides a block diagram of an example imaging system incorporating a high-resolution imager with spectral sub-arrays in accordance with the present invention;

Figure 7:
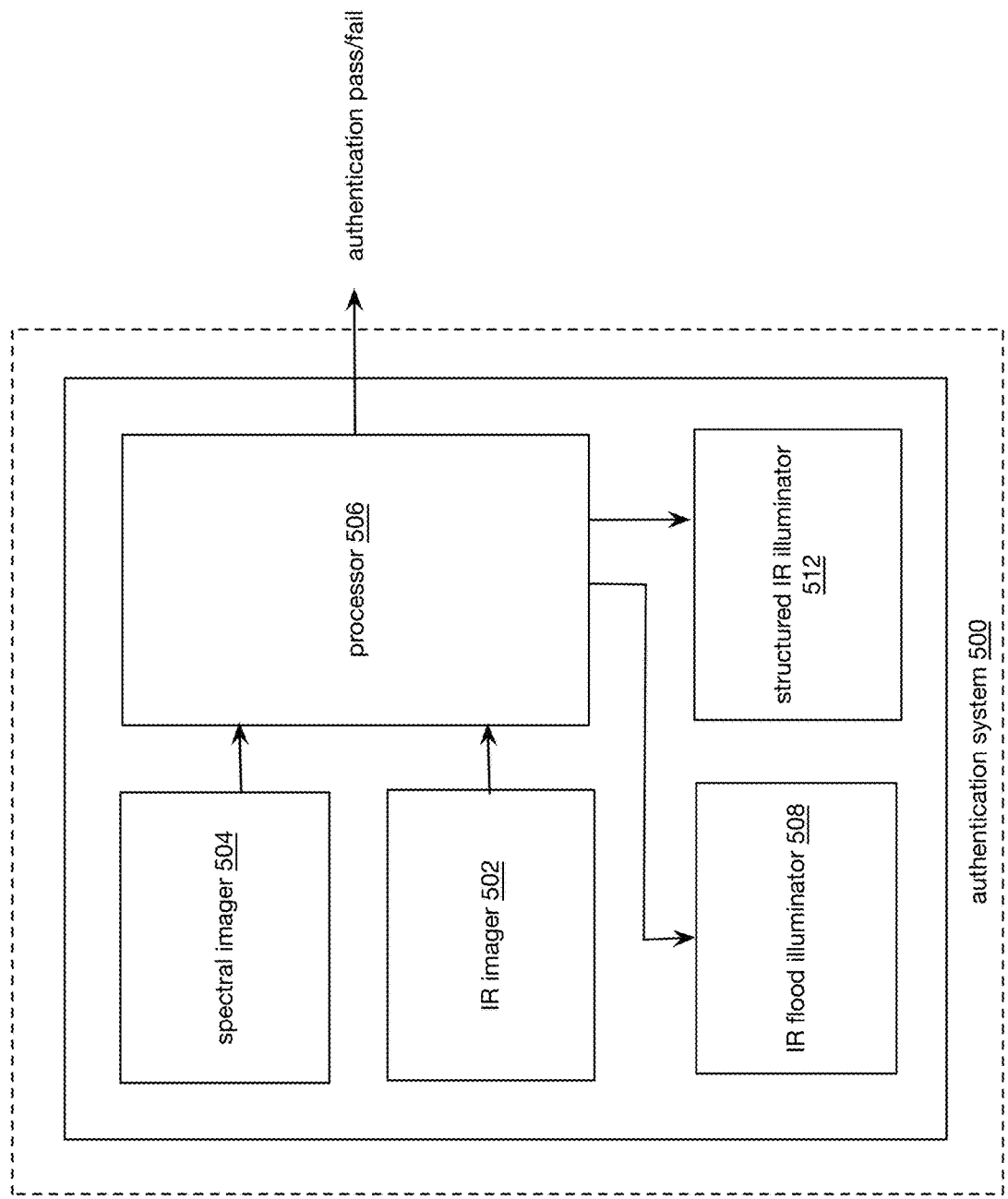
Figure 8B:
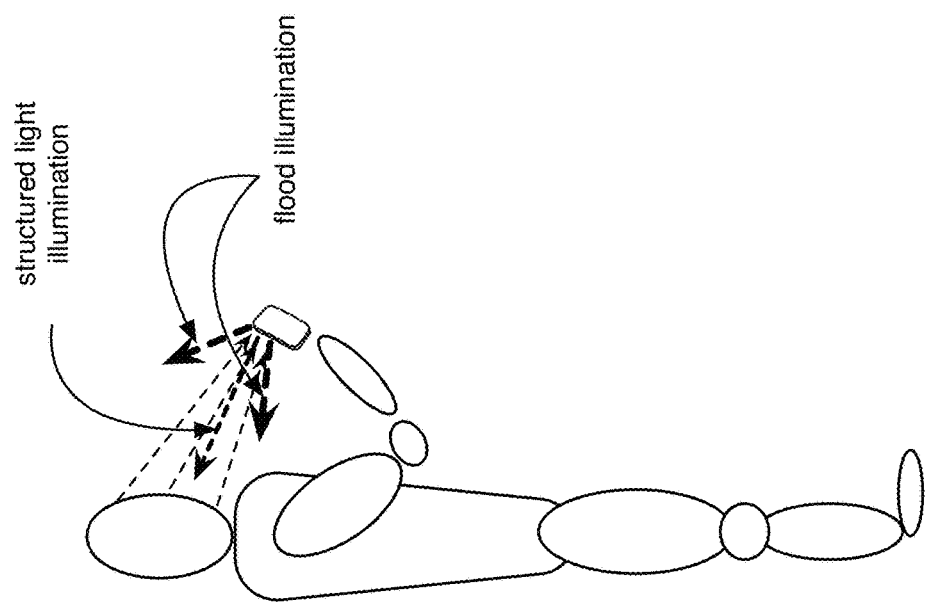
Figure 8A:
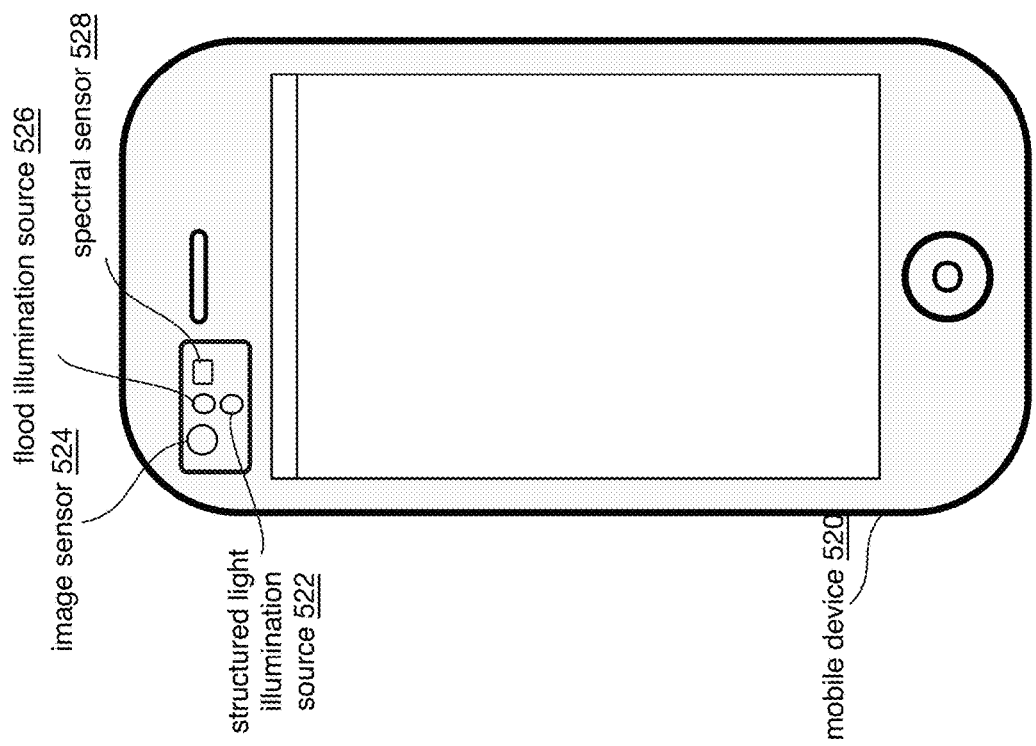
Figure 9:
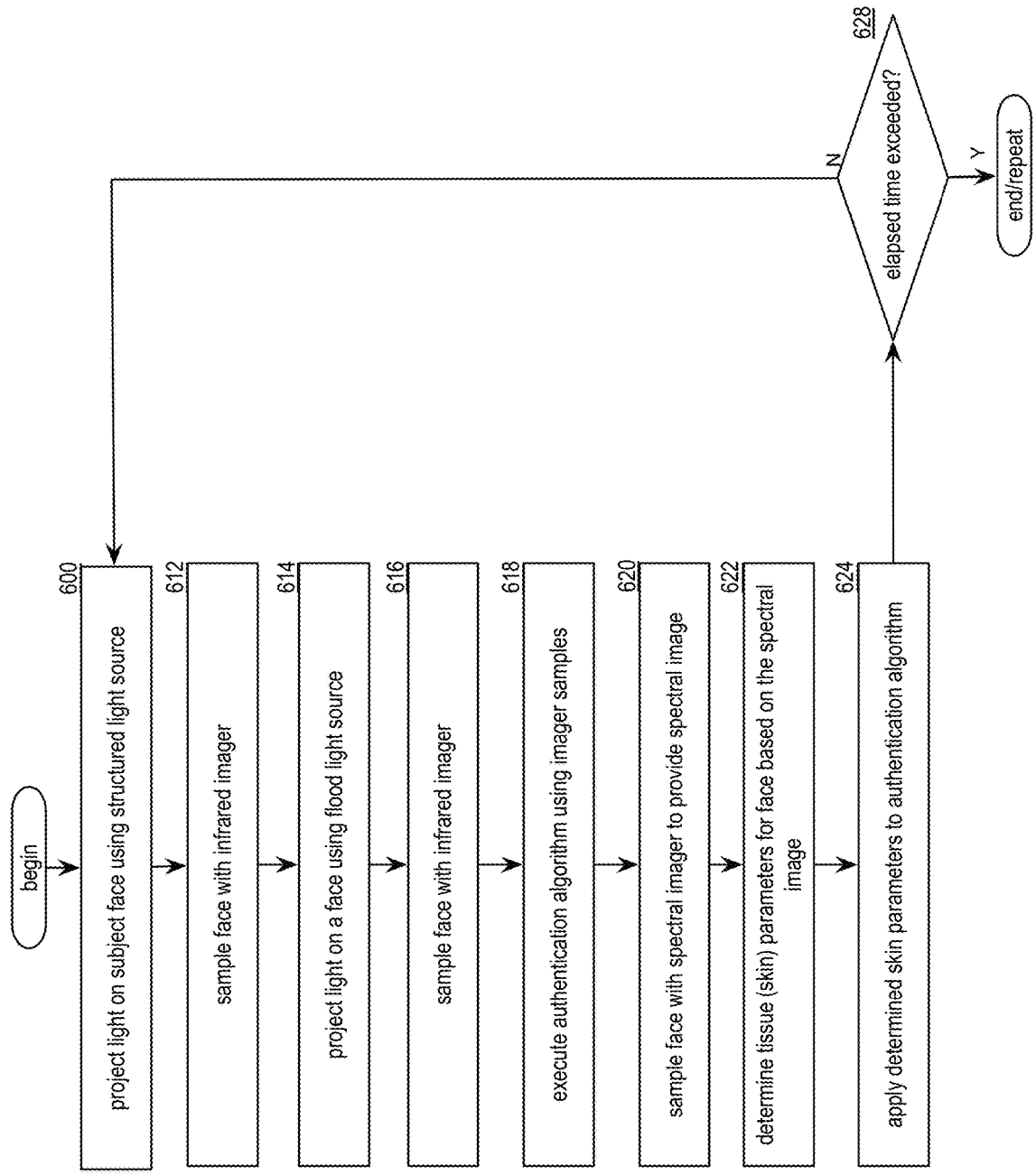

FIG. 7 provides a block diagram of an authentication system incorporating an infrared (IR) imager and a spectral imager in accordance with the present invention;

FIG. 8A provides an example of a mobile device adapted for authentication in accordance with the present invention;

FIG. 8B provides an example of a user implementing a camera or imaging mechanism for authentication in accordance with the present invention; and FIG. 9 is a flowchart of a method for using flood and structured infrared (IR) illumination with a spectral imager for authentication of a user in accordance with the present invention.

DETAILED DESCRIPTION OF THE INVENTION

In various embodiments, image sensors are combined with spectral filters such as interference-based interference filters to provide spectral information about a scene and/or light source. In some embodiments, spectral imaging of a scene can be performed and in other embodiments spectral imaging of a scene can either be combined with high resolution imaging in a single imager, or separate imagers combined after an image is collected. In further embodiments, interference-based filters can be implemented using Fabry-Perot filters integrated with image sensors, such as CMOS-based sensors, organic thin film sensors or organic photoconductive file (OPF) sensors, where each set of interference filters is aligned to at least a set of optical sensors, so that each set of optical sensors is able to sense a localized bandpass response with multiple channels to provide small-scale spectral image sensor systems. In some embodiments, small-scale spectral imaging systems can be adapted for use in applications that require image correction and/or image enhancement. Examples of applications include, but are not limited to, smart mobile phones, high resolution cameras, video cameras, security cameras, calibration systems, inspection systems and certain industrial applications.

FIG. 1 provides a top-down illustration of a spectral sensor with filters provisioned in a 3×3 patterns of 9 spectral bands each across an imager array. In the example, bandpass filters, such as Fabry-Perot filters, with different center wavelengths are patterned across the spectral sensor as a mosaic structure repeated across the array. In other embodiments, the 3×3 filter pattern can be replaced with other patterns, such as a 2×2 pattern, a 4×4 filter pattern, a 5×5 filter pattern or a 3×4 pattern, etc., as dictated by resolution and/or manufacturing requirements. In an example, a 3×3 pattern of filters provides 9 different cavity thicknesses, which are then repeated across an example sensor array. In the example of FIG. 1 each of the 9 filter thicknesses (illustrated as filters 50A-50H, etc.) is repeated 12 times across the 12×9 array of optical pixels on sensor 10.

In the sensor system based on FIG. 1 optical pixels for sensor 10 are disposed on an integrated circuit with a plurality of sets of interference filters manufactured on top of the optical pixels. In an example, a set of nine (9) interference filters 50A-50I are arranged in a mosaic pattern, each of which is configured to pass light in a different wavelength range. In an example, each set of interference filters is aligned to at least a set of optical sensors, such that each set of optical sensors is able to sense a localized bandpass response with multiple channels. The set of optical sensors and filter arrangement are then repeated across the array, enabling the optical sensor array to provide multiple measured light spectra spatially separated across different areas of an image sensor. As used herein, an individual optical sensor corresponds to a pixel (pixel=smallest addressable element), accordingly, "optical sensor", "optical pixel" and "pixel" are used interchangeably.

In an example, the image sensor of FIG. 1 can provide light information for different spatial areas of the image sensor, allowing corrections and or enhancements to be extended to each of those areas. In an example of implementation, a sensor system for imaging a scene can comprise a plurality of optical sensors on an integrated circuit, with a plurality of sets of interference filters, such as filter elements 50A-50I of FIG. 1. In the example, each set of interference filters of the plurality of sets of interference filters can include a plurality of interference filters arranged in a pattern, where each interference filter of the plurality of filters is configured to pass light in a different wavelength range. In an example, each set of interference filters of the plurality of interference filters is associated with a spatial area of the scene and a spectral response can thus be determined for each spatial area of the scene.

In an example of implementation referring to FIG. 1, a set of interference filters of a plurality of sets of interference filters can be spatially separate from others of the plurality of sets of interference filters and in another example, each set of interference filters of the plurality of sets of interference filters can be spaced randomly between the plurality of optical sensors of sensor 10.

FIG. 2A provides a top-down illustration of an example imaging array incorporating spectral macropixels. In an example of implementation and operation, an imaging system with sensor 10 can incorporate a structure such as the structure illustrated in FIG. 2A to provide spectral information while minimizing the impact of spectral information collection on the spatial resolution for the imaging system. In the example, so-called "sparse" spectrometers can be used to provide adequate spatial and spectral resolution by dispersing the sparse spectrometers among standard optical sensors, such as red, green, blue (RGB) filters, UV light sensors, or 3D sensors. In an example, spectrometers can comprise a set of spectral filters forming a spectral macropixel which is part of a larger spatial macropixel.

In the example, a macropixel 60 is associated with traditional imaging pixels overlaid with filters 54A-54E. In the example, an imager includes an array of standard imaging filter mosaics, with at least some of the mosaics incorporating filters 54A-54E to provide a color image, each imaging mosaic being associated with a single spectral macropixel 60 that occupies the space of 4 standard filter elements. In an example, each spectral macropixel 60 can provide for a multi-channel spectral response for a spatial area proximal to pixels associated with filters 54A-54E. In a specific example, filters 54A-54E can comprise filters to provide a red, green, green, blue, blue (RGGBB) imaging cell, while the spectral macropixel 60 can provide a multi-channel spectral response for the spatial area imaged by the RGGBB imaging cell. In another specific example, each of filters 54A-54E can comprise a different filter or a clear channel (white pixel) to provide a multi-channel imaging cell while the spectral macropixel 60 can provide a multi-channel spectral response for the spatial area imaged by the multi-channel imaging cell. Note that the terms "spectral mac-ropixel", "spectral pixel kernel", and/or "spectral kernel" may be used interchangeably within this document.

FIGS. 2B-2E provide top-down illustrations of example individual imaging structures incorporating spectral macropixels. In FIG. 2B, a standard red, green, blue (RGB) imager is provided in a structure utilizing filters 54A-54E, with a spectral macropixel 62 located proximal to the imaging pixels. In the example, one or more optical sensors are associated with filter 54A to provide, for example, a red pixel, while filter 54B and filter 54D can be configured to provide, for example two green pixels, with filters 54C and 54E configured to provide blue pixels. In a related example, one or more filters 54A-E are white filters (all-pass filters) or depth pixels (such as one or more pixels configured for time-based depth resolution).

In FIG. 2C, a macropixel 64 is configured in a structure utilizing filters 56A-56E, where each of 56A-56E is adapted to provide a different imaging range. In FIG. 2D, an imaging mosaic is configured such that a macropixel 66 is provided in a structure surrounding the periphery of an imaging cell. In an example, a red, green, green, blue imaging cell is provided using filter elements 58A-58D, while filter 58B and filter 58D are adapted to approximate green pixels.

In FIG. 2E, a macropixel 68 is configured adjacent to (four) 4 pixels of an imaging cell. In an example, filter elements 52A-52D are configured to provide an image cell with 4 different imaging wavelengths, while macropixel 68 is configured to provide a multi-channel spectral response for the spatial area of an image sensor associated with the image cell.

In a related example of implementation and operation, one or more spectral macropixels can be sparsely interspersed in a sensor, such as sensor 10 of FIG. 2A. In a specific example, imaging applications requiring relatively higher spectral resolution in limited and/or specific spatial areas of an image sensor can be implemented with multiple imaging cells, such as multiple red, green, green, blue (RGGB) imaging cells associated with a single spectral macropixel. In yet another example, spectral macropixels can be provided as needed/required in only some spatial areas of an image sensor, such as sensor 10 of FIG. 2A, when a relative variation in spectral information is expected for an application, such as spectral information for a small area of a scene being imaged or a preclassification of a scene indicates that spectral information is required or desired. In a related example, spectral macropixels are in a regular pattern on the image sensor, while in an alternate example, spectral macropixels are provided in an irregular pattern with different spacing/density across the image sensor.

Figure 3:
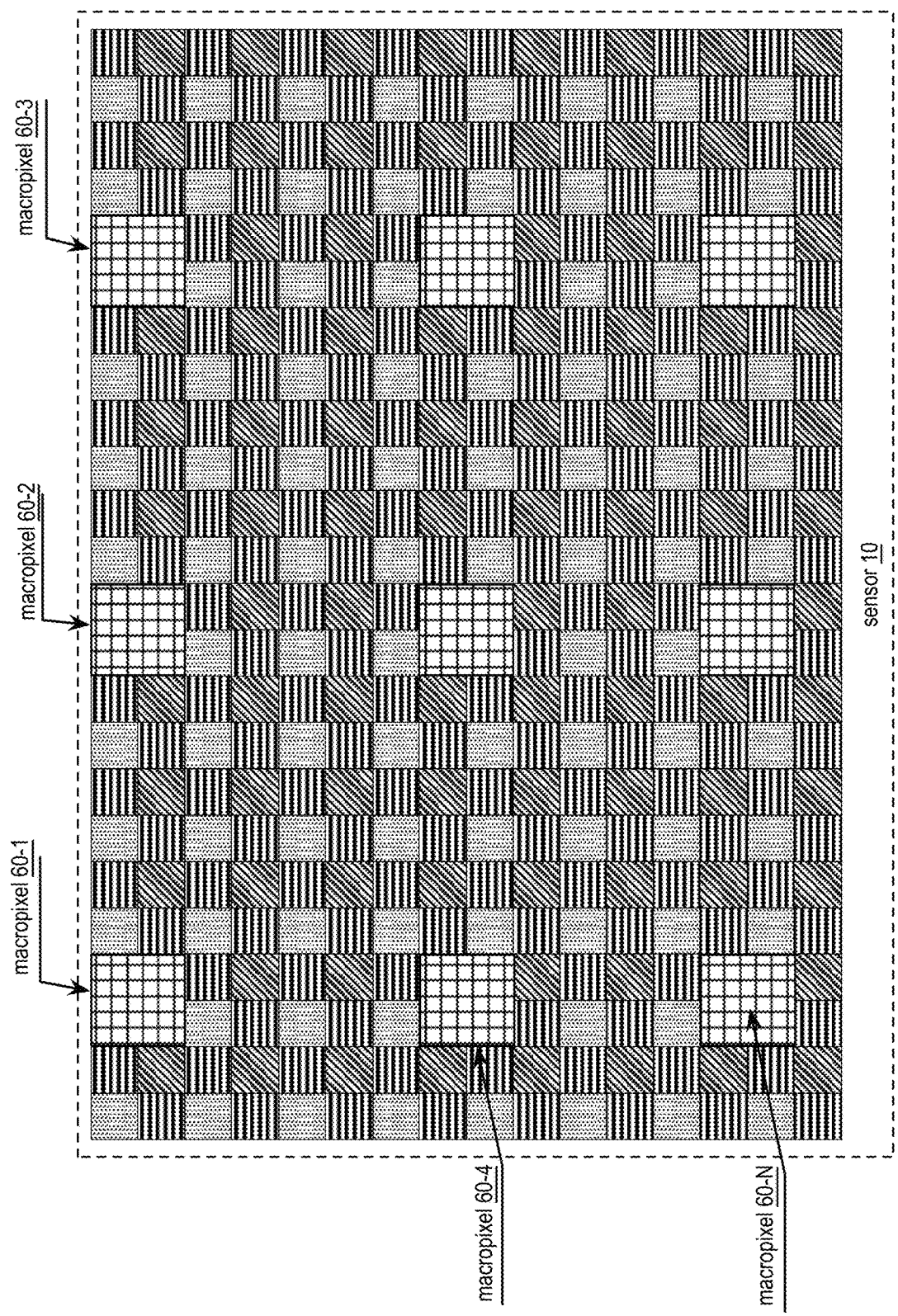

FIG. 3 provides another top-down illustration of an example imaging array incorporating spatially separated spectral macropixels. In the example, macropixels 60-1 through 60-N are provided in a regular pattern across image sensor 10. In a specific example, macropixels 60-1 through 60-N each comprise a spectral filter mosaic providing substantially identical wavelength spectra. In an alternate example, macropixels 60-1 through 60-N are each configured to provide just a portion of a full wavelength spectrum.

In an alternate example a spectral micropixel, such as any of macropixels 60-1 through 60-N is placed on one more peripheral sides of the image sensor to provide a spectral measurement outside an imaging array. In a specific related example, peripheral micropixels can be utilized to provide a diffuse measurement of a broader area of a scene being imaged. In another specific example of implementation and operation, spectral kernels on the periphery of an imaging array are configured to provide information for measuring an ambient light temperature. In yet another related example, a sensing mode for an image sensor includes a configuration using spectral kernels adapted for providing information for measuring a diffuse spectrum of a scene or an object in a scene.

Figure 4A:
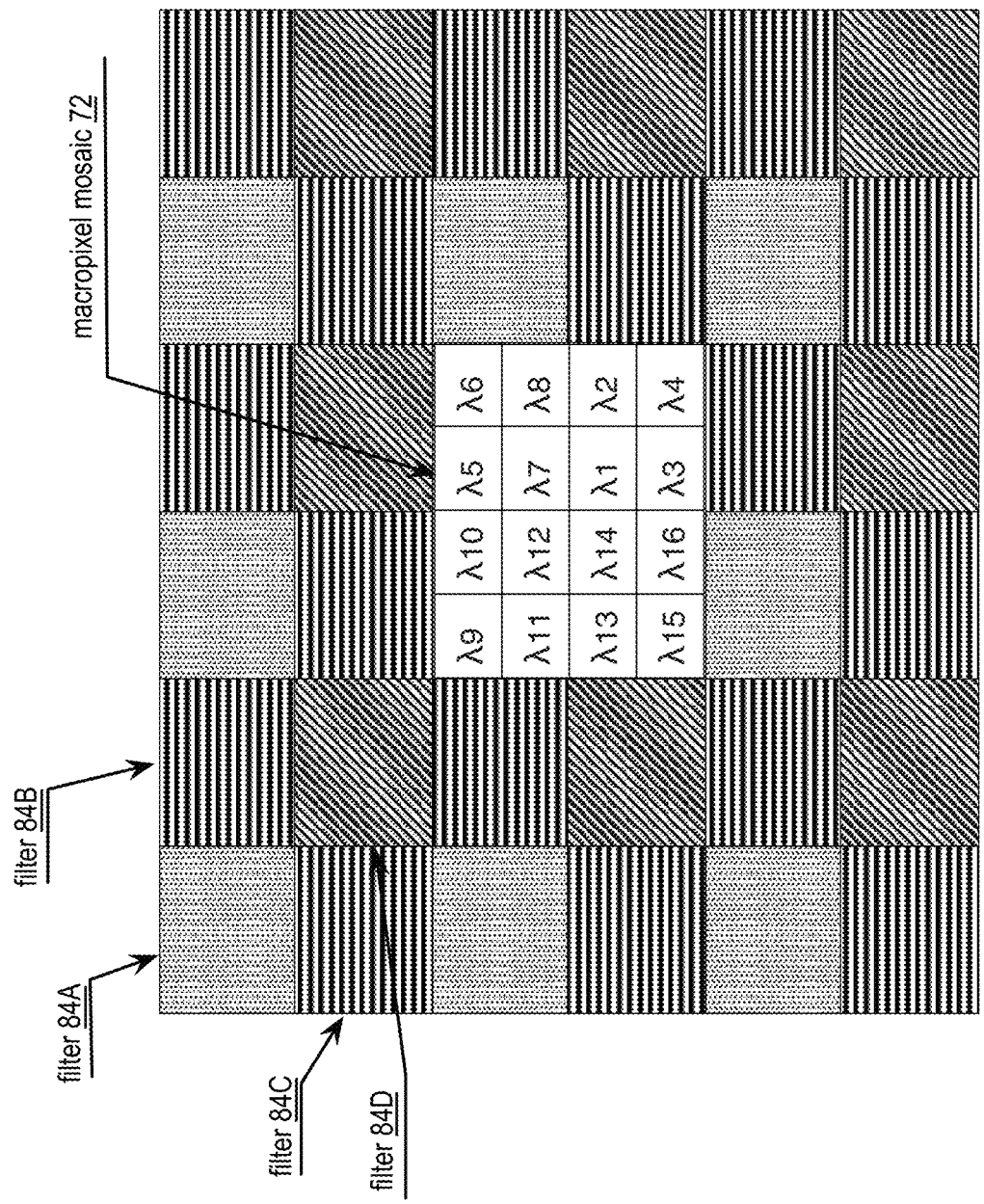

FIG. 4A provides a top-down illustration of a portion of an example imaging array incorporating a spectral macropixel. In the example, macropixel mosaic 72 is configured to provide 16 wavelength ranges for a wavelength spectrum. In the example, macropixel mosaic 72 is configured to occupy an area of an image sensor that would otherwise provide pixels of an image sensor, such as the 4 pixels of a red, green, green, blue (RGGB) sensor. In the example provided, 8 imaging cells associated with filter elements 84A-84D are repeated across an imaging sensor, with macropixel mosaic 72. In an example, the array of FIG. 4A is repeated over an imaging sensor, so that macropixel mosaic 72 is repeated across the spatial area of the imaging sensor.

In an example, macropixel mosaic 72 comprises optical sensors for wavelengths $\lambda_1$-$\lambda_{16}$, where optical sensors associated with each of $\lambda_1$-$\lambda_{16}$ is configured to provide a filter response for different wavelengths of incident light at the macropixel. In an example, the combined filter response for the optical sensors associated with each of $\lambda_1$-$\lambda_{16}$ is configured to provide spectral output for a desired spectral range.

In a specific example referring to FIG. 4A, the wavelengths transmitted by filters $\lambda 9$-$\lambda 12$ include wavelengths in a range associated with filter 84A, the wavelengths $\lambda 5$-$\lambda 8$ include wavelengths in a range associated with filter 84B, the wavelengths $\lambda 13$-$\lambda 6$ include wavelengths in a range associated with filter 84C, and the wavelengths $\lambda 1$-$\lambda 4$ include wavelengths in a range associated with filter 84D, such that macropixel mosaic 72 provides transmission of light in wavelength ranges associated with 84A-84D. Accordingly, macropixel mosaic 72 can be used to provide more precise (more granular) color imaging for wavelengths transmitted by filters 84A-84D. In an example, filters 54A-54D correspond respectively to a red, green, green, blue (RGGB) sensor.

Figure 4B:
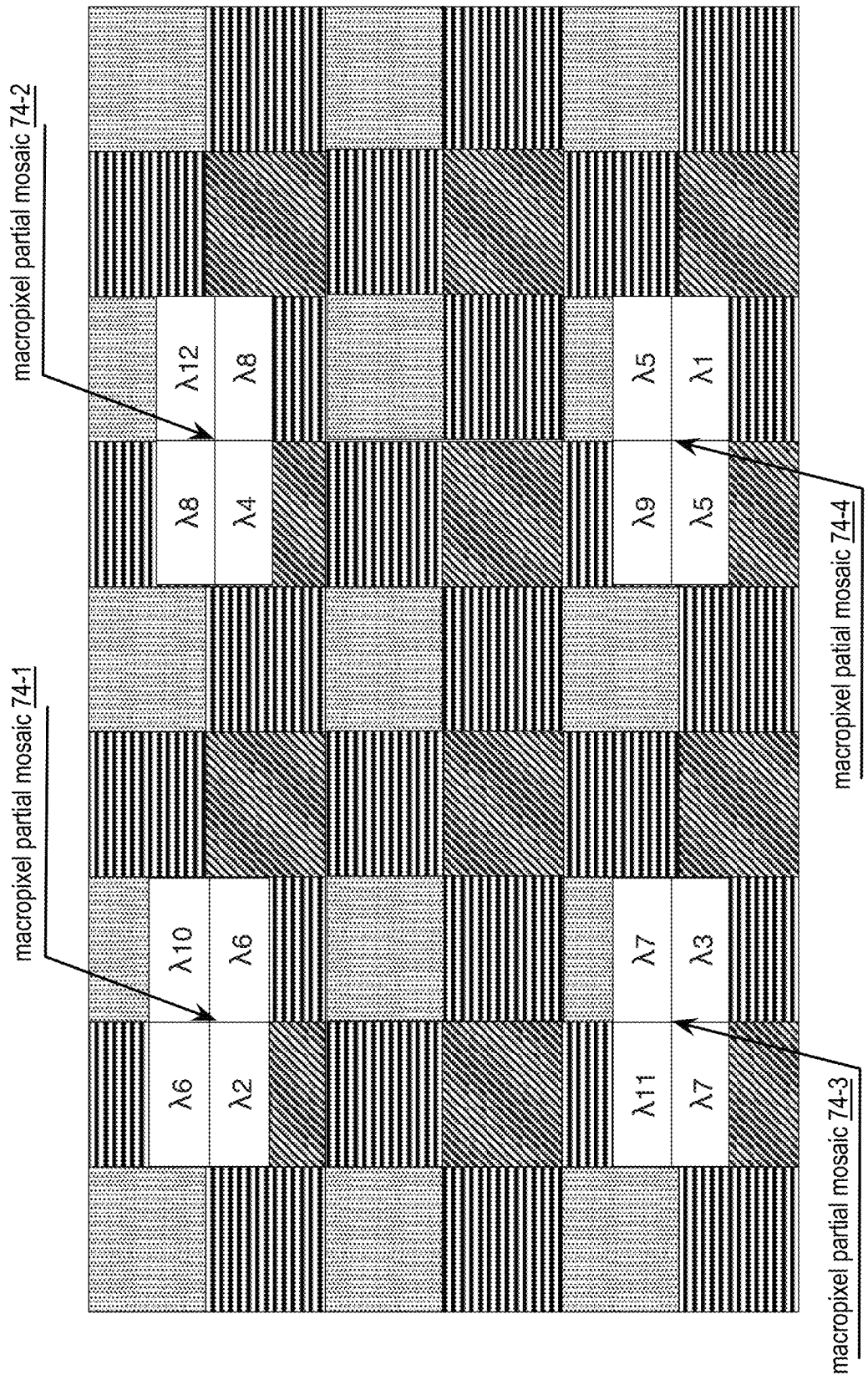

FIG. 4B provides a top-down illustration of an imaging array incorporating spatially separated partial spectral mosaics of example spectral macropixels. In the example, each of macropixels 74-1 through 74-4 is configured to provide a filter response for a portion of a spectral range, such as a full wavelength spectrum. In the example, each of the macropixel partial mosaics 74-1 through 74-4 are configured with a portion of the wavelengths being collected on an image sensor, such as image sensor 10 from FIG. 2A.

In a specific example of implementation and operation, some of the imaging filters of FIG. 4B are partially replaced by spectral filters for wavelengths $\lambda 1$-$\lambda 16$, such that the filter wavelength of a spectral filter configured to replace imaging filters transmit light in a wavelength range associated with the imaging filter it replaces.

In a specific example of implementation and operation, an image sensor is configured with an array of sparsely distributed spectral pixel kernels. The spectral pixel kernel includes a set of spectral filters each configured to measure a spectral response for each local portion of an image sensor used to image a scene. In a specific example, spectral pixel kernels form an array of spectrometers across an image sensor, such as sensor 10 of FIG. 2A. In an example, pixels not included in the spectral pixel kernels are configured to pass light in a normal/standard imaging mode.

In another example, the spatial configuration of the sparsely distributed spectral pixel kernels is adapted for use with predetermined optics of a given imaging system. In an example, a set of spectral pixel kernels is sparsely repeated across an image array such that the geometrical configuration of the repeated spectral kernels is adapted to symmetrical properties of an imaging lens (or imaging lenses).

In another specific example of implementation and operation, one or more spectral filter kernels are adapted to include a set of closely aligned spectral filters configured to provide a filter response for a spectrum of optical wavelengths. In an example, the spectral filter kernels adapted to include a set of closely aligned spectral filters are sparsely distributed across the imaging array. In yet another specific example of implementation and operation, some spectral filter kernels are adapted to provide a filter response for a different relatively granular portions of a wavelength spectrum are sparsely distributed across an imaging array and together provide a full wavelength spectrum.

In another example, different spectral filters are configured to be sparsely distributed across the imaging array (i.e. not adjacent to each other). In an example, spectral measurements are then enabled by combining several of the sparsely distributed filters across the array. Accordingly, in the example, one or more spectral kernels are distributed in different non-adjacent portions across the array. In a specific related example, a superset of filters together forming a spectral kernel with non-adjacent spectral bands, can themselves be repeated such that multiple spectral kernels with non-adjacent spectral bands, are distributed across an imaging array.

In another specific example of implementation and operation, spectral kernels can be adapted to form a local point measurement when imaging a scene. For example, a set of spectral kernels can be configured to form a local imaging kernel, where each of the spectral kernels is further configured to image a portion of a scene being imaged.

In an example of implementation, pixels for resolution imaging (imaging pixels) can be panchromatic pixels (sensitive to all colors in the visible spectrum). In another implementation example, pixels for resolution imaging can contain color filters such as absorptive RGB filters, UV filters, interference filters, plasmonic filters, nanostructured filters, polarizing filters or other filter types.

In another specific example of implementation, sparsely distributed spectral kernels are provided on a heterogenous image sensor. In the example, an image sensor is configured in different groups of imaging pixels with the spectral kernels of different groups being represented relatively sparsely or densely within the image sensor. In yet another specific example, an imaging array and/or image sensor can comprise a combination of monochromatic imaging pixels and 3D sensing pixels. In yet another specific example, spectral kernels can include interference filters. In another example, some of the optical sensors underlying a filter array are adapted for sensing short-wave infrared (SWIR) light. In yet another example, some of the optical sensors underlying a filter array are adapted for autofocus.

In a specific example of implementation and operation, an image sensor is configured for three-dimensional (3D) image sensing. In an example, a normal imaging mode can be a mode configured for structured light imaging. In another example, a normal imaging mode can be a mode configured for time-of-flight imaging. In a specific example of implementation, a 3D sensing operation uses near-infrared spectrum (NIR) light. In another specific example, the 3D sensing operation is adapted for face recognition, with the spectral sensor kernels configured to measure a spectral response for light received from specific regions of a scene. In a specific example related to 3D image sensing, spectral kernels are used to measure tissue parameters, such as the face of a user being imaged using a 3D imager. In specific example of implementation and operation, spectral kernels are configured to provide information capable of assisting the execution of a facial authentication exercise and, in a related example, spectral kernels can be configured to provide information for anti-spoofing during execution of facial authentication.

In a specific example of implementation and operation, an imaging mode for an imaging system is adapted for acquisition of an image (such as a 3D image) of a scene. In the example, spectral kernels associated with the imaging system can assist automatic white balancing. In a related example, the imaging system includes a front facing camera. In a specific related example, spectral kernels associated with the imaging system can provide information for determining accurate skin tone. In an example, spectral kernels associated with a 3D imaging system are adapted for use concurrent with a 3D imaging mode for the system.

In a specific example of implementation and operation, an imaging system is adapted to provide interpolation for missing pixels resulting from the displacement of the missing pixels with spectral pixel kernels in an imaging array. In a specific example, spectral kernels can be used to provide information for use with 3D imaging using time-of-flight pixels. In another example, the illumination of a screen from an imaging system, such as a camera, can be used in combination with spectral filter kernels to provide information for assisting representing an accurate and/or precise spectra for a scene or object being imaged.

In an example of implementation, an imaging system includes a focusing lens optimized for a plurality of operational modes, the operational modes including a general imaging mode and at least one mode for use with spectral kernels. In a related implementation example, an imaging system can include a lens element adapted to be reconfigurable and in a related example, the reconfigurable lens element can enable execution of multiple operational modes, such as sequential operational modes. In a related example, a reconfigurable lens element can be adapted to refocus for each of a plurality of modes. In another related example, a reconfigurable lens element is purposely adapted to allow out of focus operation for a diffuse spectral sensing mode. In yet another related example, a diffuse spectral sensing mode is executed using adapted to use information collected using one or more spectral kernels.

In a specific example of implementation and operation, a rejection filter element in the optical stack of an imaging system is adapted to pass near-infrared (NIR) light for use in 3D imaging and for spectral imaging kernels, while substantially rejecting light outside of one or more desired NIR wavelengths. In a related example, a glass filter adapted to restrict and/or attenuate light in one or more particular wavelength ranges is configured to be mechanically retracted for one or more of a plurality of imaging modes.

In an example implementation, an imaging system comprises image sensor pixels with standard red, green and blue (RGB) filters. In another example, some image sensor pixels in an imaging system comprise modulating or time-of-flight pixels, while in other examples some image sensor pixels in an imaging system comprise autofocus pixels. In an example imaging system, an image sensor is configured with a plurality of readout modes and/or pixel types for different operational modes. In an example, an imaging system comprises both imaging pixels and spectral pixels adapted for use in different and/or same modes. In a related example, an image sensor, either alone or as part of an imaging system, is configured to operate a plurality of readout modes and/or pixel types sequentially, while in one or more additional modes the imaging pixels and spectral pixels are configured to operate concurrently.

In an example implementation, an imaging system comprises an image sensor that includes micro-lenses positioned on top of the filters (i.e. configured so that incident light entering the imaging system passes through the micro-lenses first). In a related example implementation, a plurality of micro lens types are adapted for use with spectral pixels, while the plurality of micro lens types are different than a plurality of micro lens types adapted for use with imaging pixels.

Figure 4C:
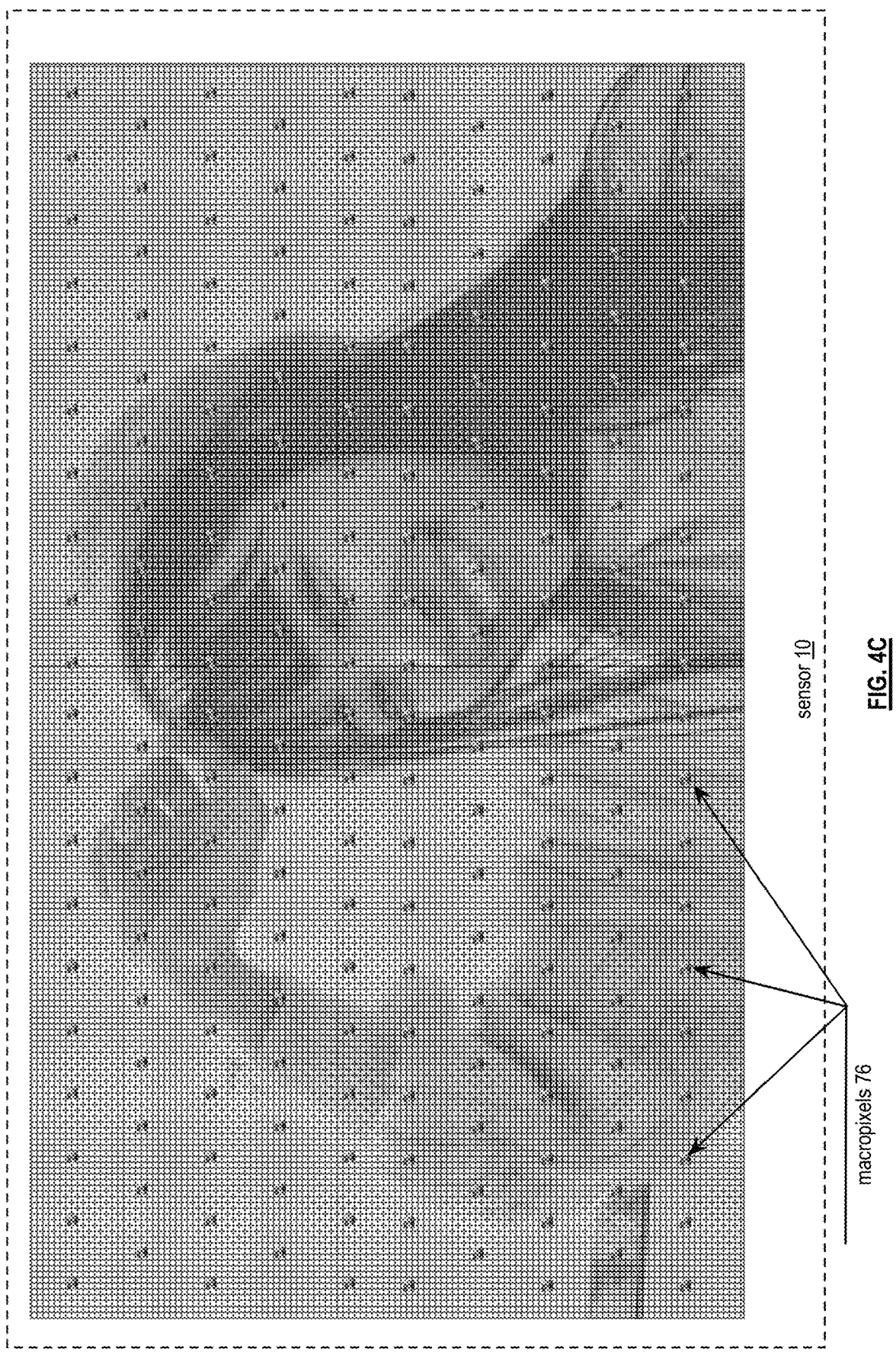

FIG. 4C provides an image illustrating the implementation of an imaging array incorporating spatially separated spectral macropixels. In the example, macropixels 76 are located within regularly spaced spatial areas of an imaging array. In an example of operation, the macropixels are used to correct and/or enhance the associated spatial areas of a resultant image.

Figure 5:
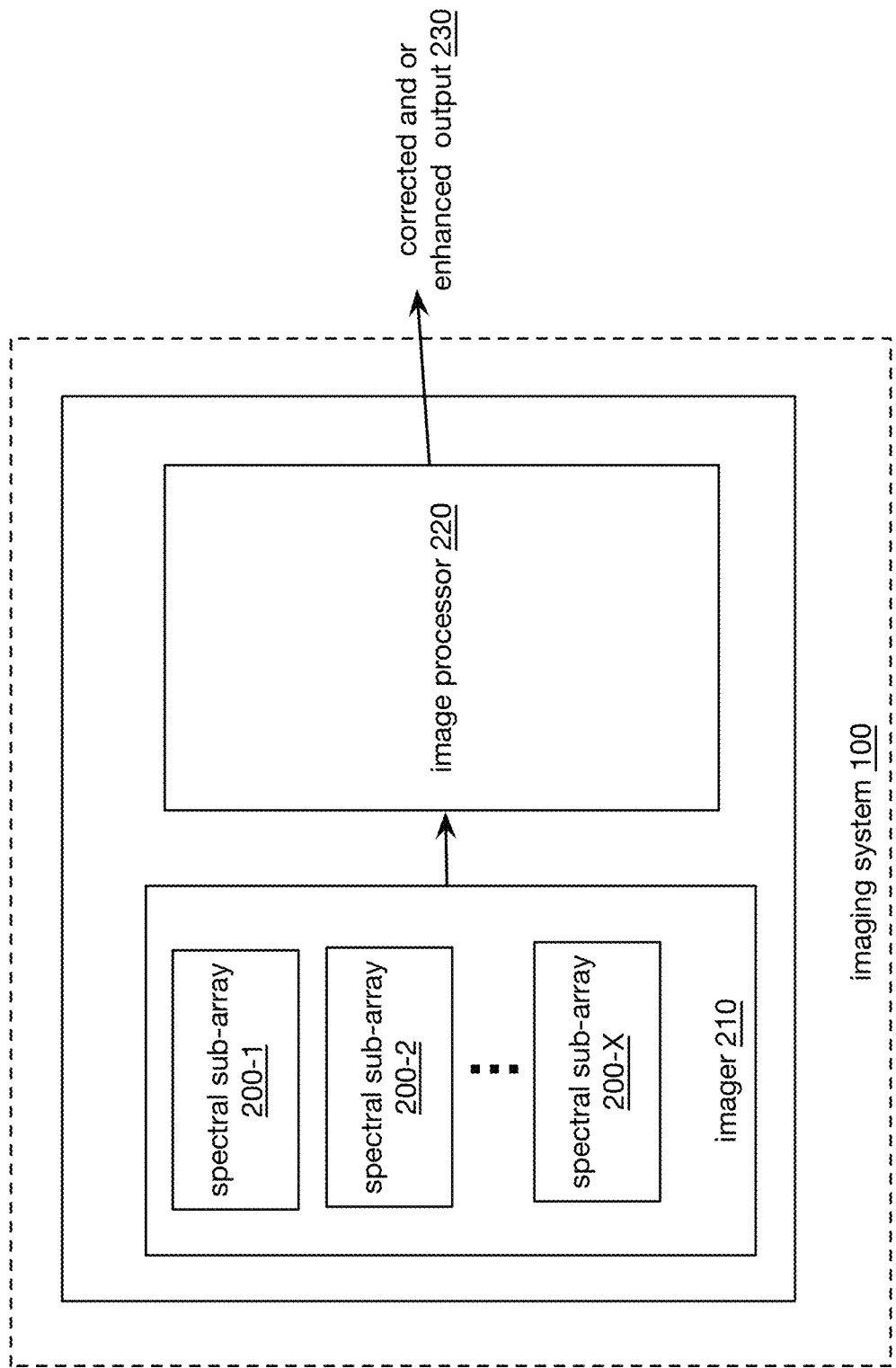

FIG. 5 provides a block diagram of an example imaging system incorporating a high-resolution imager with spectral sub-arrays. In the example, imaging system 100 includes an imager 210, which can include high resolution pixels, along with a plurality of spatially separated spectral sub-arrays 200-1 through 200-X. In a specific example, the spectral sub-arrays 200-1 through 200-X are distributed substantially evenly across the area of imager 210. In an alternative example, the spectral sub-arrays 200-1 through 200-X are distributed across the area of imager 210 in a predetermined pattern to enable more of the spectral sub-arrays 200-1 through 200-X in specific locations of imager 210. In a specific example of implementation and operation, each of plurality of spatially separated spectral sub-arrays 200-1 through 200-X comprises a mosaic of spectral sensor elements adapted to provide a spectrum of wavelengths based on light received at imager 210.

In an example, image processor 220 is adapted to receive an output from imager 210 and spectral sub-arrays 200-1 through 200-X. In another example, image processor 220 is further adapted to correct and/or enhance the output of imager 210 based on the output from spectral sub-arrays 200-1 through 200-X. In an example of implementation, imager 210 is adapted with an interface providing for a single output for both high resolution pixels of imager 210 and spectral sub-arrays 200-1 through 200-X to image processor 220. In another example, the output from high resolution pixels of imager 210 and spectral sub-arrays 200-1 through 200-X can be provided separately to image processor 220.

Figure 6B:
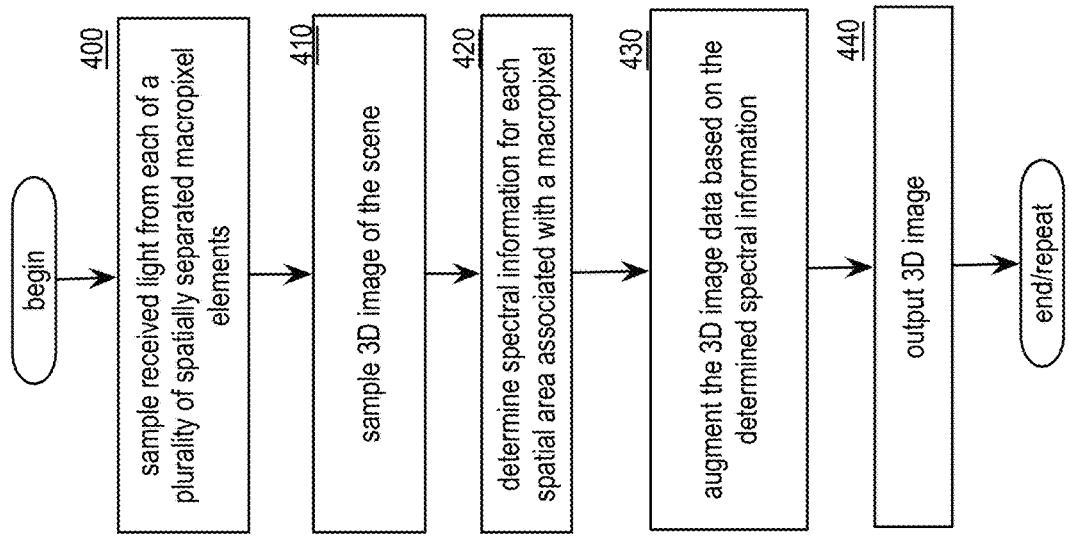
FIG. 6B is a flowchart illustrating an example method for correcting image data using spatially separated macropixels in accordance with the present invention.
Figure 6A:
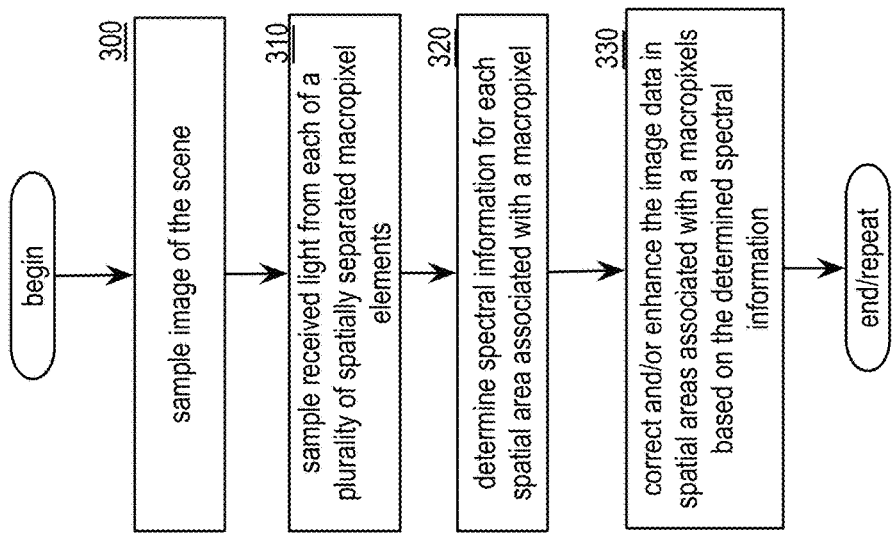
FIG. 6A is a flowchart illustrating an example method for correcting image data using spatially separated macropixels in accordance with the present invention.

FIG. 6A is a flowchart illustrating an example method for correcting image data using spatially separated macropixels. The method begins at step 300, with an imager sampling a scene and continues at step 310 by sampling received light for each pixel of the spatially separated macropixels. At step 320, the method continues, with the spectral information for each macropixel being determined and then continues at step 330, where the image data for the scene is corrected and/or enhanced in the spatial areas associated with the determined macropixel spectral information.

FIG. 6B is a flowchart illustrating another example method for correcting image data using spatially separated macropixels. The method begins at step 400 by sampling the spectrum of the received light for each pixel of the spatially separated macropixels. At step 410, the method continues, with a 3D sampling of the scene. At step 420, the method continues, with the spectral information for each macropixel being determined and then continues at step 430, where the spectral information is used to augment the 3D data of the scene. At step 440, the augmented 3D data is used to produce an enhanced 3D image.

FIG. 7 provides a block diagram of an authentication system incorporating an infrared (IR) imager and a spectral imager. In the example, authentication system 500 includes IR flood illuminator 508, which is configured to provide relatively uniform, high frequency modulated light for projection on an object to be authenticated, such as a user's face. In an example, IR imager 502 is substantially synchronized with the output of IR flood illuminator 508 and is adapted to sample IR radiation reflected by the object. In an example, the authentication system of FIG. 7 is adapted to determine a round trip time, using a time-of-flight mechanism, for light projected by IR flood illuminator 508 on the object until it is received at IR imager 502. In an example, one or more modules associated with processor 506 are adapted to synchronize the output of IR flood illuminator 508 with image sampling by IR imager 502. In a specific example, processor 506 includes additional modules adapted to execute a time-of-flight algorithm based on output from IR imager 502 to resolve the distance between IR imager 502 and an object being authenticated. In a specific example, IR imager 502 is implemented with spectral imager 504 on the same image sensor and adapted to provide one or more output signals to processor 506. In an alternative example, IR imager 502 is implemented separately from spectral imager 504, with each adapted to provide one or more output signals to processor 506.

In a specific example, IR flood illuminator 508 comprises one or more light emitting diodes (LEDs). In another example, IR flood illuminator 508 comprises one or more laser sources, wherein the laser provides a pulse of IR radiation. In an example, authentication system 500 can include structured IR illuminator 512 to illuminate the object with different patterns, such as grids, dots, or lines. In an example, structured IR illuminator 512 can include a dot grid pattern to inspect a few points on the object, or in another example, a line or multiple line pattern can be projected by structured IR illuminator 512 to, for example, determine an object's three-dimensional profile. In a specific example of operation and implementation, structured IR illuminator 512 can utilize a triangulation-based illumination for determining the dimensions of the object while it is being scanned. In another related example, structured IR illuminator 512 can utilize a shadow illumination in combination with triangulation-based illumination to determine the dimensions of an object while it is being scanned, based on reflected and/or refracted radiation. In yet another example, structured IR illuminator 512 can utilize a dot pattern or a grid pattern to determine depth information of the object at a plurality of discrete points on the object in a single exposure (i.e., without being scanned).

FIG. 8A provides an example of a mobile device adapted for authentication. In the example, mobile device 520 includes a camera or imaging mechanism adapted for authentication of a user of the mobile device 520. In a specific example, the camera or imaging mechanism includes a module with one or more illumination sources, along with specialized sensors. Referring to FIG. 7, one or more of the illumination sources can be adapted to project infrared (IR) radiation on the face of a user. Example illumination sources include flood illumination source 526 and/or structured light illumination source 522. In a specific example, a processor can be implemented in a camera or imaging module and adapted for control of flood illumination source 526 and/or structured light illumination source 522. In an alternative example, control of flood illumination source 526 and/or structured light illumination source 522 can be executed by a processor shared with other functions of mobile device 520.

In the example illustrated, an image sensor 524 and a spectral sensor 528 are provided to sample light, such as infrared (IR) light reflected from the face of a user for authentication. In an example, image sensor 524 is adapted for authentication functions, in addition to normal camera function. In an alternative example, image sensor 524 is dedicated to an authentication function. In a related example, spectral sensor 528 can be adapted to an authentication function, or alternatively, spectral sensor 528 can be adapted for other uses beyond authentication. In a specific related example, the one or more illuminations sources can be adapted to provide dedicated illumination enabling spectral sensor 528 to spectrally sample reflected light. In another example, image sensor 524 and spectral sensor 528 are implemented in the same image sensor, such as image sensor 10 from FIG. 2A.

FIG. 8B provides an example of a user implementing a camera or imaging mechanism for authentication. In an example, a mobile device, such as mobile device 520 of FIG. 8A, is adapted to provide structured light illumination and flood illumination light that is reflected from a user's face to provide three dimensional depth information at a plurality of discrete points from the user's face. In an example, a camera or imaging mechanism can include a spectral sensor for determining the tissue parameters, such as skin parameters for the user's face, which can be used to augment the three-dimensional depth information in an authentication system.

In an example of operation, the addition of tissue parameters to an authentication algorithm can be used for defeating various spoofing efforts, such as, for example, the use of a mask, or a disembodied body part to authenticate the use of the mobile device. In an example, the skin parameters collected using a spectral sensor can indicate whether blood is circulating in skin tissue (such as facial tissue) and/or whether the tissue is a proper temperature, along with other tissue parameters that are either indicators of living tissue and/or whether the tissue parameters match a particular user.

FIG. 9 is a flowchart of a method for using flood and structured infrared (IR) illumination with a spectral imager for authentication of a user. The method begins at step 600, with the projection of light from a structured IR light source on the user's face and continues at step 612 with the sampling of light reflected from the user's face by an imager adapted to sense IR radiation. At step 614, the method continues, with the projection of light from a flood IR light source on the user's face and continues at step 616 with the sampling of light reflected from the user's face by the imager. In another example, the steps 600 and 614 can be reversed in order, so that sampling of the reflected light from the flood IR light source is executed first. The method continues at step 618, with the execution of an authentication algorithm using the samples from steps step 612 and step 616. The method then continues at step 620, with a spectral imager being used to sample an image of the user's face, followed at step 622, tissue (such as skin) parameters for the user's face being determined based on the sampled spectral image. At step 624 the method continues, with the tissue parameters being applied to the authentication function to augment the authentication algorithm and finally, if the time elapsed from step 600 does not exceed a predetermined time period, the authentication is complete. Conversely, if the predetermined time period has been exceeded, the method can re-initiate with step 600.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, output(s), input(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An imaging system, the system comprising:
   an array of optical sensors having a respective top surface and a respective bottom surface;
   a first plurality of sets of optical filters, wherein each set of optical filters of the first plurality of sets of optical filters is associated with a respective set of optical sensors of the array;
   a second plurality of sets of optical filters, wherein each set of optical filters of the second plurality of sets of optical filters is associated with a respective set of optical sensors of the array, wherein each optical filter of a set of optical filters of the second plurality of sets of optical filters is configured to pass light of a respective wavelength range, wherein the second plurality of sets of optical filters are interspersed spatially across the top surface of the array of optical sensors; and
   one or more processors adapted to:
      sample an image of a scene based on an output from a first plurality of sets of optical sensors of the array; and
      sample a received light spectrum for each set of optical sensors of a second plurality of sets of optical sensors of the array.

2. The imaging system of claim 1, wherein the array of optical sensors is provisioned on an integrated circuit.

3. The imaging system of claim 1, wherein the first plurality of sets of optical filters are associated with the first plurality of optical sensors and the second plurality of sets of optical filters are associated with the second plurality of sets of optical sensors.

4. The imaging system of claim 1, wherein a set of optical filters of the first plurality of sets of optical filters are arranged in a Bayer pattern and the second plurality of sets of optical filters are arranged in a mosaic comprising equal to or more than 9 different wavelength ranges.

5. The imaging system of claim 1, wherein a set of optical filters of the second plurality of sets of optical filters includes optical filters selected from a group consisting of:
   interference filters,
   Fabry-Perot filters,
   absorptive filters,
   interference filters,
   plasmonic filters, and
   nanostructured filters.

6. The imaging system of claim 1, wherein a set of optical filters of the first plurality of sets of optical filters includes optical filters selected from a group consisting of:
   absorptive RGB filters,
   UV filters,
   interference filters,
   plasmonic filters,
   nanostructured filters, and
   polarizing filters.

7. The imaging system of claim 1, wherein the first plurality of sets of optical filters includes one or more sets of optical filters selected from a group consisting of:
- red, green, blue (RGB) filters,
- red, green, green, blue (RGGB) filters,
- absorptive RGB filters, and
- red, green, green, blue, blue (RGGBBB) filters.

8. The imaging system of claim 1, wherein the optical sensors are selected from a group consisting of:
- three dimensional (3D) sensors,
- ultraviolet sensors,
- organic thin film sensors,
- organic photoconductive file (OPF) sensors,
- panchromatic sensors,
- CMOS sensors,
- short-wave infrared (SWIR) sensitive sensors, and
- infrared sensors.

9. The imaging system of claim 1, wherein a set of optical sensors associated with a set of optical filters of the second plurality of sets of optical filters is adapted to sense a localized bandpass response with multiple wavelength channels.

10. The imaging system of claim 1, wherein the array of optical sensors is formed across a surface, wherein the surface is divided into a plurality of equal sectors X, wherein the second plurality of sets of optical filters are interspersed spatially across the surface so that each sector X includes a set of optical filters of the second plurality of sets of optical filters.

11. The imaging system of claim 1, further comprising:
one or more optical elements, wherein the array of optical sensors is formed across a surface, wherein the surface is divided into a plurality of sectors, wherein the second plurality of sets of optical filters are interspersed spatially across the surface based on a predetermined pattern, wherein the predetermined pattern is based on the optical elements.

12. A method comprises:
sampling, by an imaging system, an output from a first subset of optical sensors of an optical sensor array to generate an image of a scene, wherein a subset of optical sensors of the first subset of optical sensors is associated with a first set of optical filters;
sampling, by the imaging system, a second subset of optical sensors of the optical sensor array to generate a plurality of received light spectra, wherein a subset of optical sensors of the second subset of optical sensors is associated with a second set of optical filters, wherein each optical filter of a second set of optical filters is configured to pass light of a respective wavelength range, wherein each set of optical filters of the second set of optical filters is interspersed spatially across the optical sensor array; and
based on the plurality of received light spectra, modifying the image.

13. The method of claim 12, wherein the optical sensor array is provisioned on an integrated circuit.

14. The method of claim 12, wherein the optical filters in the first set of optical filters are arranged in a Bayer pattern and the second plurality of sets of optical filters are arranged in a mosaic comprising equal to or more than 9 different wavelength ranges.

15. The method of claim 12, wherein a set of optical filters of the second set of optical filters includes one or more optical filters selected from a group consisting of:
- interference filters,
- Fabry-Perot filters,
- absorptive filters,
- interference filters,
- plasmonic filters, and
- nanostructured filters.

16. The method of claim 12, wherein a set of optical filters of the first set of optical filters includes optical filters selected from a group consisting of:
- absorptive RGB filters,
- UV filters,
- interference filters,
- plasmonic filters,
- nanostructured filters, and
- polarizing filters.

17. The method of claim 12, wherein a set of optical filters of the first set of optical filters includes one or more sets of optical filters selected from a group consisting of:
- red, green, blue (RGB) filters,
- red, green, green, blue (RGGB) filters,
- absorptive RGB filters, and
- red, green, green, blue, blue (RGGBBB) filters.

18. The method of claim 12, wherein one or more optical sensors of the optical sensor array are selected from a group consisting of:
- three dimensional (3D) sensors,
- ultraviolet sensors,
- organic thin film sensors,
- organic photoconductive file (OPF) sensors,
- panchromatic sensors,
- CMOS sensors,
- short-wave infrared (SWIR) sensitive sensors, and
- infrared sensors.

19. The method of claim 12, wherein each set of optical sensors associated with a set of optical filters of the second set of optical filters is adapted to sense a localized bandpass response with multiple wavelength channels.

20. The method of claim 12, wherein the imaging system includes one or more optical elements, the optical sensor array having a respective top surface and a respective bottom surface, wherein the top surface is divided into a plurality of sectors, wherein the second plurality of sets of optical filters are interspersed spatially across the surface based on a predetermined pattern, wherein the modifying the image is further based on the received light spectra associated with the predetermined pattern.

* * * * *